(12) United States Patent
Kotalwar et al.

(10) Patent No.: US 9,699,073 B2
(45) Date of Patent: Jul. 4, 2017

(54) SYSTEM AND METHOD FOR REDUCING TRAFFIC LOSS WHILE USING LOOP FREE ALTERNATE ROUTES FOR MULTICAST ONLY FAST REROUTE (MOFRR)

(71) Applicant: ALCATEL-LUCENT USA INC., Murray Hill, NJ (US)

(72) Inventors: Jayant Kotalwar, Cupertino, CA (US); Jaishal Shah, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 201 days.

(21) Appl. No.: 14/035,576

(22) Filed: Sep. 24, 2013

(65) Prior Publication Data

US 2015/0085644 A1 Mar. 26, 2015

(51) Int. Cl.
*H04L 12/18* (2006.01)
*H04L 12/703* (2013.01)
*H04L 12/721* (2013.01)
*H04L 12/707* (2013.01)

(52) U.S. Cl.
CPC .......... *H04L 45/28* (2013.01); *H04L 12/1863* (2013.01); *H04L 45/12* (2013.01); *H04L 45/22* (2013.01)

(58) Field of Classification Search
CPC ..... H04L 45/28; H04L 45/22; H04L 12/1863; H04L 45/12; H04L 12/18
See application file for complete search history.

(56) References Cited

U.S. PATENT DOCUMENTS

| 6,816,498 B1 * | 11/2004 | Viswanath .......... H04L 12/5693 370/401 |
|---|---|---|
| 2002/0004843 A1 * | 1/2002 | Andersson et al. .......... 709/238 |
| 2003/0117950 A1 * | 6/2003 | Huang .................... H04L 45/00 370/220 |
| 2008/0267078 A1 * | 10/2008 | Farinacci et al. ............. 370/244 |
| 2009/0161670 A1 | 6/2009 | Shepherd |
| 2012/0315030 A1 * | 12/2012 | Singh et al. ...................... 398/1 |
| 2013/0322231 A1 * | 12/2013 | Csaszar et al. ............... 370/217 |
| 2013/0322233 A1 * | 12/2013 | Csaszar .................... H04L 45/22 370/218 |
| 2015/0023156 A1 * | 1/2015 | Csaszar et al. ............... 370/228 |
| 2015/0213075 A1 * | 7/2015 | Collinge ............. H04L 63/0236 709/213 |

OTHER PUBLICATIONS

International Search Report and Written Opinion of PCT/US2014/053070, dated Nov. 26, 2014, pp. 1-13.

(Continued)

*Primary Examiner* — Noel Beharry
*Assistant Examiner* — Ruihua Zhang
(74) *Attorney, Agent, or Firm* — Tong, Rea, Bentley & Kim, LLC (57) ABSTRACT

A system, method and apparatus for adapting operation of a router configured to receive commonly sourced traffic via primary and secondary Upstream Multicast Hop (UMH) links, wherein the secondary path is cached for a predetermined period of time to avoid data loss upon restoration of the primary path.

18 Claims, 4 Drawing Sheets

(56) References Cited

OTHER PUBLICATIONS

Karan et al: "Multicast only fast re-route; draft-karan-mofrr-02", internet engineering task force, IETF; standard working draft, internet society (ISOC) 4, Rue Des Falaises CH—1205 Geneva, Switzerland, Mar. 9, 2012 (Mar. 9, 2012), pp. 1-15, XP015081655, [retrieved on Mar. 9, 2012] application paragraph [1. introduction] paragraph [2. basic. overview] paragraph [5.detecting.failures].
Yuksel M et al: "Cross-layer techniques for failure restoration of IP multicast with applications to IPTV", Communication Systems and Networks (COMSNETS), 2010 Second International Conference on, IEEE, Piscataway, NJ, USA, Jan. 5, 2010 (Jan. 5, 2010), pp. 1-10, XP031648941, ISBN: 978-1-4244-5487-7 p. 4, paragraph B. Major.Tasks.and.Rules.

\* cited by examiner

FIG. 4

SYSTEM AND METHOD FOR REDUCING TRAFFIC LOSS WHILE USING LOOP FREE ALTERNATE ROUTES FOR MULTICAST ONLY FAST REROUTE (MOFRR)

FIELD OF THE INVENTION

The invention relates to the field of communication networks such as multi-protocol label switching (MPLS) networks and, more particularly but not exclusively, to point to multipoint (P2MP) traffic path management.

BACKGROUND

Multicast Only Fast Re-Route (MoFRR) is an enhancement to multicast routing protocols such as Protocol Independent Multicast (PIM), Multi-point Label Distribution Protocol (mLDP) and so on. An implementation of MoFRR is described in more detail in Internet Engineering Task Force (IETF) Network Working Group draft document dated Mar. 9, 2012 and entitled "draft-karan-mofrr-02" (hereinafter "Karan"). Briefly, on a PIM enabled edge router having multicast receivers, MoFRR logic determines a primary Upstream Multicast Hop (UMH) and a secondary UMH and joins the tree via both simultaneously. Data packets are received over the primary and secondary paths. Only the packets from the primary UMH are accepted and forwarded down the tree, the packets from the secondary UMH are discarded. The UMH determination is different for PIM and mLDP.

When a failure is detected on the path to the primary UMH, a repair occurs by changing the secondary UMH into the primary and the primary into the secondary. Since the repair is local it is performed very quickly, thereby greatly improving convergence times in the event of node or link failures on the path to the primary UMH.

Unfortunately, when a link or node on the path towards the multicast source is restored, normal PIM or mLDP functions may result in a traffic loss.

SUMMARY

Various deficiencies in the prior art are addressed by systems, methods and apparatus for adapting operation of a router configured to receive commonly sourced traffic via primary and secondary Upstream Multicast Hop (UMH) links, wherein the secondary path is cached for a predetermined period of time to avoid data loss upon restoration of the primary path.

One embodiment may be used at, illustratively, a router configured to receive commonly sourced traffic via a first link associated with a primary path Upstream Multicast Hop (UMH) and a second link associated with a secondary path UMH, wherein in response to detecting a primary path error, adapting a forwarding plane to forward traffic associated with the secondary path UMH and caching the secondary path UMH as a primary path UMH; and in response to detecting a primary path restoration, starting a timer and adapting the forwarding plane to continue forwarding traffic associated with the secondary path UMH until the occurrence of the expiry of the timer or the arrival of traffic from the primary path UMH.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various embodiments will be described within the context of a provider edge (PE) router operating as a merge point router to join a multicast tree via two upstream paths; preferably divergent upstream paths to ensure thereby maximum redundancy. Generally speaking, the merge point router typically only accepts and forwards on one of the upstream paths at the time in order to avoid duplicate packet forwarding. The selection of the primary and secondary UMH is done by MoFRR logic and normally based on unicast routing to find loop free candidates. The various operations described herein are also applicable to multicast routing. It will be appreciated by those skilled in the art that the various embodiments described herein are applicable to other types of networks, network topologies, protocols and the like.

The various embodiments will generally be described using functionality discussed within the IETF Draft Document of Mar. 9, 2012 entitled draft-karan-mofrr-02 (hereinafter "Karan"), which is incorporated herein by reference in its entirety). The inventors also contemplate that the various embodiments are applicable to many other protocols and techniques such as described in various other IETF documents, versions of the Karan document and so on, as will be appreciated by those skilled in the art.

Figure 1:
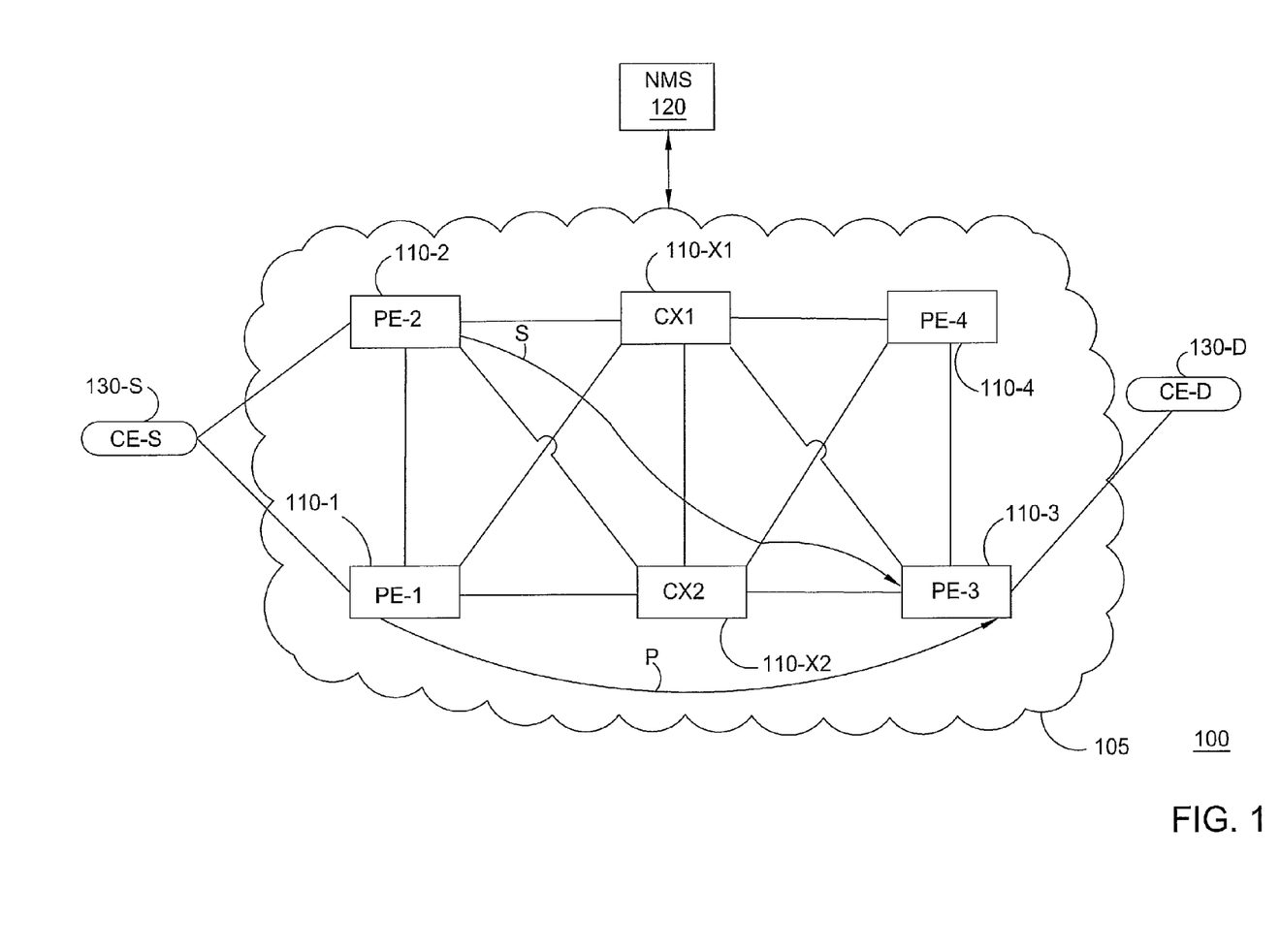
FIG. 1 depicts an exemplary network benefiting from the various embodiments.

FIG. 1 depicts a high-level block diagram of a communication network architecture benefiting from various embodiments. Specifically, the exemplary architecture 100 of FIG. 1 includes a communication network (CN) 105, illustratively a Multi-Protocol Label Switching (MPLS) network, and at least one network management system (NMS) 120 operative to, illustratively, route traffic between a source Customer Edge (CE) router CE-S 130-S and a destination CE router CE-D 130-D via one or both of primary and secondary label switched paths (LSPs); namely, primary path P and secondary path S, each of which is associated with a respective control plane. As depicted, one or more NMSs 120 are operative to control a plurality of routers 110 forming the CN 105 in a manner supporting at least two control planes; namely, a plurality of Provider Edge (PE) routers 110-1 through 110-4, and a plurality of core routers 110-X1 and 110-X2. It will be noted that while only four PE routers are depicted, the CN 105 may include many more PE routers. Similarly, while only two core routers are depicted, the CN 105 may include many more core routers. The representation of the CN 105 is simplified for purposes of this discussion.

The one or more NMSs 120 are network management systems adapted for performing the various management functions described herein and are adapted to communicate with nodes of CN 105. The NMSs 120 may also be adapted to communicate with other operations support systems (e.g., Element Management Systems (EMSs), Topology Management Systems (TMSs), and the like, as well as various combinations thereof).

The NMSs 120 may be implemented at a network node, network operations center (NOC) or any other location capable of communication with the CN 105 and various elements related thereto. The NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein with respect to the various embodiments. The NMS 120 may be implemented as a general purpose computing device or specific purpose computing device, such as described below with respect to FIG. 3.

As depicted in FIG. 1, a traffic stream (e.g., a video or other data stream) is communicated from a source Customer Edge (CE) router CE-S 130-S to a destination CE router CE-D 130-D via each of primary and secondary label switched paths (LSPs); namely, primary path P and secondary path S. Primary path P originates at PE 110-1, traverses the core of CN 105 and terminates at PE 110-3. Secondary path S originates at PE 110-2, traverses the core of CN 105 and terminates at PE 110-3. These paths may comprise disjoint paths. In normal operation, traffic from primary path P is forwarded by PE 110-3 to the CE router 130-S, while traffic from secondary path S is dropped by PE 110-3.

Figure 2:
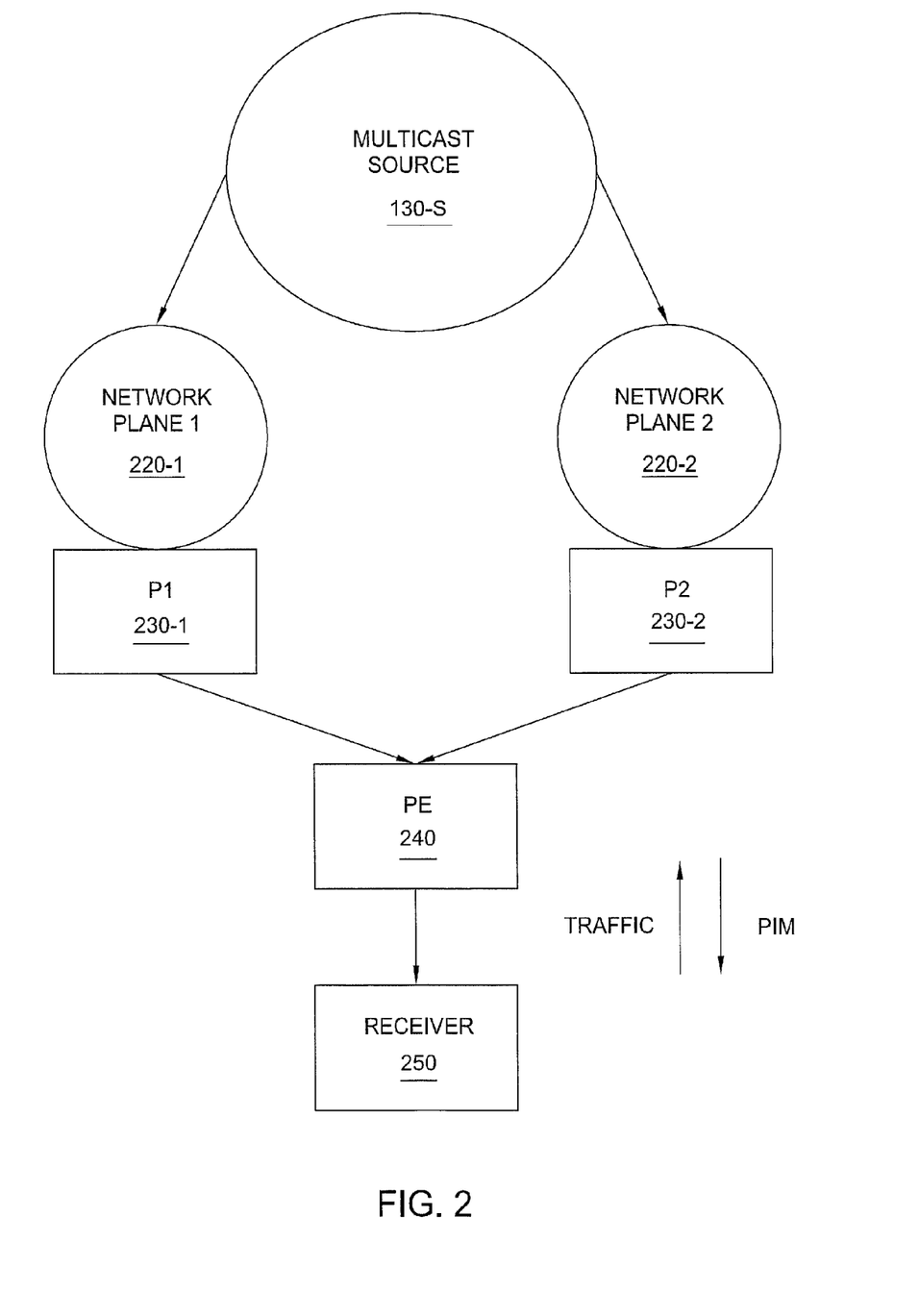
FIG. 2 depicts a simplified representation of an exemplary network benefiting from the various embodiments.

FIG. 2 depicts a simplified representation of an exemplary network benefiting from the various embodiments. Specifically, FIG. 2 depicts a multicast source 130-S delivering common traffic toward a provider edge (PE) router 240 via each of a primary network plane 220-1 and a secondary network plane 220-2. The PE router 240 forwards traffic to a receiver 250 from one of the primary network plane 220-1 or secondary network plane 220-2.

Also depicted in FIG. 2 is a primary path Upstream Multicast Hop (UMH) 230-1 (P1) and a secondary path UMH 230-2 (P2). The primary path UMH 230-1 and secondary path UMH 230-2 provide unicast routes by which the PE router 240 may reach the multicast source 130-S. Specifically, the unicast route has P1 as the primary next hop and P2 as the LFA next hop.

PE router 240 is configured to join the primary path UMH 230-1 and secondary path UMH 230-2 via a PIM (S,G) join. Illustratively, as per the MoFRR procedures described in the Karan document, the PE router 240 sends a PIM (S,G) join to both of the next hops P1 and P2.

In a steady state mode of operation (no primary network plane failure), the PE router 240 receives traffic from the primary next hop 230-1 via link L1, and from the Loop Tree Alternate (LFA) next hop 230-2 via link L2. The traffic from the primary next hop 230-1 (i.e., P2) is forwarded to the receiver 250, while the traffic from the LFA next hop 230-2 (i.e., P2) is dropped. That is, in a steady-state multicast traffic received by the PE router 240 from the primary network plane 220-1 is forwarded to the receiver 250, while the same multicast traffic received by the PE router 240 from the secondary network plane 220-2 is dropped.

In response to a failure in the primary network plane 220-1, the traffic from the primary network plane 220-1 is dropped and the traffic from the second or network plane 220-2 is forwarded to the receiver.

If the link L1 fails, Protocol Independent Multicast (PIM) at the PE router 240 will quickly detect this failure via Bi-directional Forwarding Detection (BFD) or some other mechanism. The PE router 240 will, via PIM, reprogram the forwarding plane to start accepting traffic arriving on link L2. Subsequently, any interior gateway protocols (IGPs) such as Open Shortest Path First (OSPF), Intermediate System to Intermediate System (IS-IS), Border Gateway Protocol (BGP) and the like will run a Shortest Path First (SPF) calculation to determine a backup path, selecting P2 as the new primary next hop. Since PIM has already modeled P2 as a primary next hop, the new route need not result in any PIM protocol actions.

When the link L1 is restored, IGP will again run a SPF calculation and include L1 as the primary next hop. However since IGP does not compute the LFA next hops along with the primary next hop, the new unicast route will only have L1 as the primary next hop; that is, there will be no LFA next hop. When PIM receives this route, it would take the protocol action of sending a (S,G) join to primary next hop P1 and (S,G) prune to the old next hop P2 (this next hop is removed by the IGP).

This action of PIM in response to link L1 restoration may result in a traffic loss. Specifically, traffic may be lost during the time it takes for the PIM (S,G) join to traverse hop by hop in the primary network plane 220-1 and reach the multicast source 130-S, and the time it takes for the multicast traffic to start flowing through the primary network plane 220-1 and arrive at the PE 240. Depending on the network topology, the traffic might take many seconds to arrive at the PE. This loss of traffic defeats the primary purpose of the MoFRR LFA feature, which is to avoid excessive traffic losses. Various embodiments described herein are operative to reduce or remove such traffic loss.

Specifically, various embodiments operate to cache (for a hold-time period) the next hop that the route table manager has marked for deletion and continue to accept multicast traffic from that next hop. The old next hop will become a LFA next hop or it will be deleted by PIM. The old next hop will be deleted if (A) the SPF calculation does not select the old next hop; or (B) the hold timer expires.

Figure 3:
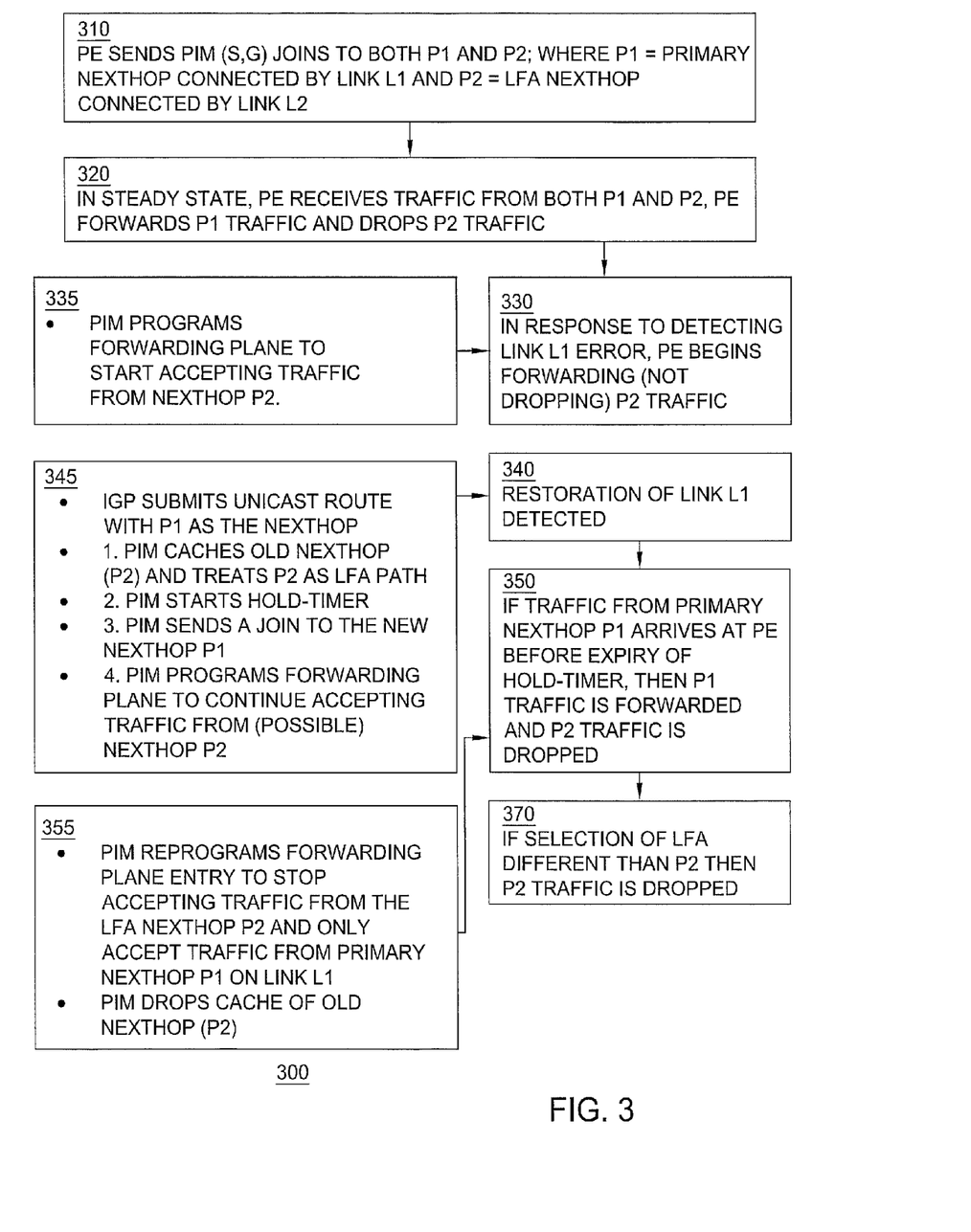
FIG. 3 depicts a flow diagram of a method according to one embodiment.

FIG. 3 depicts a flow diagram of a method according to one embodiment. Specifically, the method 300 of FIG. 3 depicts various control plane processes invoked by, illustratively, PE router 240 in response to a failure and subsequent restoration associated with the primary network plane 220-1.

At step 310, PE router 240 sends PIM (S,G) joins to both the when and P2; where P1 is the primary next hop connected by Link L1 to primary network plane 220-1 and P2 is the LFA next hop connected by link L2 to secondary network plane 220-2.

At step 320, traffic is flowing in a steady state and that the PE router 240 receives multicast traffic from both P1 and P2, forwards the P1 traffic toward the receiver 250 and drops the P2 traffic.

At step 330, in response to detecting a link L1 error (generically, a failure associated with network plane 220-1) the PE router 240 begins forwarding the P2 traffic toward the receiver 250 and dropping/ignoring any P1 traffic. Referring to box 335, at the PE router 240 PIM programs a forwarding plane to start accepting traffic from next hop P2.

At step 340, restoration of link L1 is detected (generically, a failure associated with network plane 220-1 has been corrected such that a multicast path supported by network plane 220-1 is restored). Referring to box 345, IGP submits the unicast route with P1 as the next hop for SPF calculation. In addition, PE router 240 PIM performs the following steps:

(1) cache the old next hop (i.e., P2);
(2) start a hold timer;
(3) send a join to the new next hop P1; and (4) program the forwarding plane to continue accepting traffic from potential next hop P2.

At step 350, if traffic from primary next hop P1 arrives at PE router 240 prior to the expiry of the hold timer started at step 340, then P1 traffic is forwarded to the receiver 250 while P2 traffic is dropped. Referring to box 355, PE router 240 PIM performs the following steps:

(1) reprogram the forwarding plane entry to stop accepting traffic from the LFA next hop P2 and only accept traffic from primary next hop P1 by a link L1; and (2) drop the cache of the old next hop P2.

At step 370, if there is a selection (e.g., via IGP) of a new LFA path that is different than P2, then P2 traffic is dropped.

In the embodiments discussed herein, caching the secondary path UMH as a primary path UMH and starting the timer are performed in response to a detection of restoration of link L1 (e.g., at step 340). In various other embodiments, one or both of caching the secondary path UMH as a primary path UMH and starting the timer may be performed in response to detecting a link L1 error (e.g., at step 330). Additional timers may also be used within the context of the various embodiments.

Thus, the method 300 of FIG. 3 contemplates various embodiments which are invoked in response to a failure of a link L1 while multicast traffic is arriving at the PE 240 via link L2 from next hop P2. If link L1 comes back up (restored), IGP will submit the unicast route with P1 as the next hop. IGP has not computed the LFA path yet. In such a situation wherein the LFA path did not come in the unicast route, PIM caches the old primary next hop (P2) and treats it as the LFA path. PIM s a hold-timer and hold this next hop till the hold-timer expires. PIM performs various protocol operations such as sending a join to the new next hop P1, as well as programming the forwarding entry of the forwarding table to send the first packet that arrives on link L1 to the protocol. In addition, PIM also programs the forwarding plane to continue accepting traffic from next hop P2. When the traffic from primary next hop P1 begins arriving at the PE 240, PIM will take the action of reprogramming the forwarding plane entry to stop accepting traffic from the LFA next hop P2 and only accept traffic from primary next hop P1 on link L1.

At a first time t1, in response to the primary path failure, PIM may perform the protocol operation of sending a join to the new next hop P1; PIM will program the forwarding plane entry to send the first packet that arrives on link L1 to the protocol (while continuing to accept traffic from next hop P2).

At a second time t2, in response to receiving traffic from restored primary next hop P1, PIM will reprogram the forwarding plane entry to stop accepting traffic from the LFA next hop P2 and only accept traffic from primary next hop P1 on link L1.

Between the first time t1 and second time t2, several scenarios may occur, as noted below:

In one scenario, where IGP is unable to calculate an LFA path, PIM will never hear from IGP. In this scenario, the hold-timer will expire and PIM will remove the cached next hop P2. If the traffic from P1 was received before the hold-timer expiry, there will be no traffic loss.

In another scenario, where IGP computes an LFA path that happens to be a path different than P2, PIM will remove P2 and send a join to the new LFA path. If the traffic from P1 was received before removing the LFA path P2, there will be no traffic loss.

In still another scenario, which is also the most likely scenario, IGP finds P2 as the new LFA path, and PIM disables the hold-timer and take no further action. There will be no traffic loss in this scenario as well.

Figure 4:
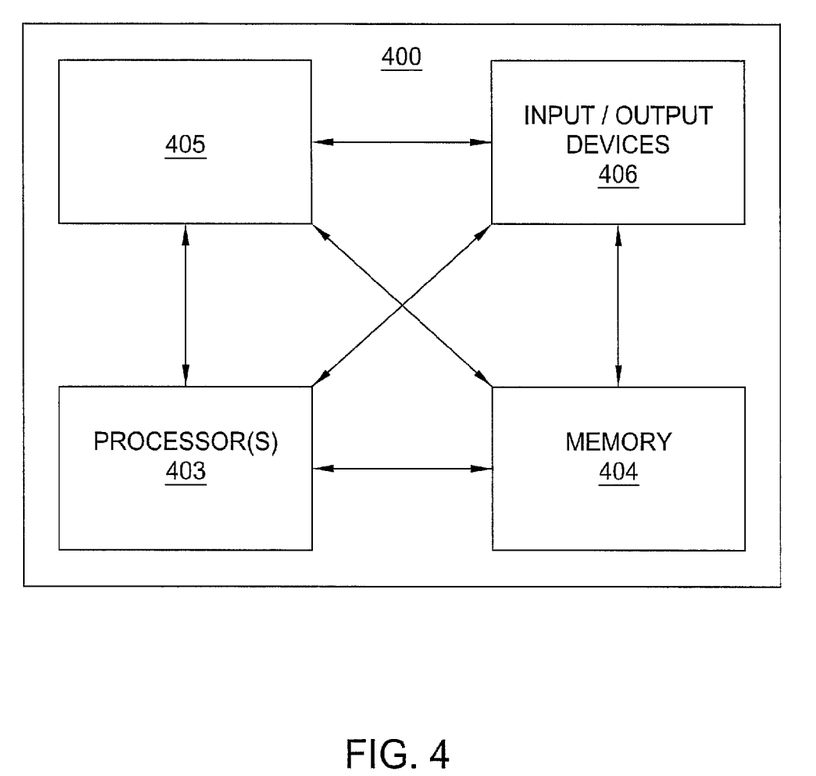
FIG. 4 depicts a high-level block diagram of a computer suitable for use in performing functions described herein.

FIG. 4 depicts a high-level block diagram of a computing device, such as a processor in a telecom network element, suitable for use in performing functions described herein such as those associated with the various elements described herein with respect to the figures.

As depicted in FIG. 4, computing device 400 includes a processor element 403 (e.g., a central processing unit (CPU) and/or other suitable processor(s)), a memory 404 (e.g., random access memory (RAM), read only memory (ROM), and the like), a cooperating module/process 405, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 405 can be loaded into memory 404 and executed by processor 403 to implement the functions as discussed herein. Thus, cooperating process 405 (including associated data structures) can be stored on a computer readable storage medium, e.g., RAM memory, magnetic or optical drive or diskette, and the like.

It will be appreciated that computing device 400 depicted in FIG. 4 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method for use at a router configured to receive commonly sourced traffic via a first link associated with a primary path Upstream Multicast Hop (UMH) and a second link associated with a secondary path UMH, the method comprising:

in response to detecting a primary path error, adapting a forwarding plane of the router to accept traffic associated with the secondary path UMH; and in response to detecting a primary path restoration, computing a route including the primary path UMH as a primary path next hop, sending a join from the router toward the primary path UMH based on the route for using the primary path UMH as a primary path next hop, marking the secondary path UMH for deletion at the router, caching the secondary path UMH at the router based on absence of the secondary path next hop from the route for maintaining the secondary path UMH as a secondary path next hop and for preventing deletion of the secondary path UMH at the router, starting a timer associated with caching of the secondary path UMH at the router, and adapting the forwarding plane of the router to continue accepting traffic associated with the cached secondary path UMH until the occurrence of the expiry of said timer or the arrival of traffic from the primary path UMH.

2. The method of claim 1, wherein, prior to detecting the primary path error, said router accepts traffic associated with the primary path UMH and drops traffic associated with the secondary path UMH.

3. The method of claim 1, further comprising:
in response to detecting said primary path error, performing a shortest path first (SPF) calculation.

4. The method of claim 1, further comprising:
in response to detecting said primary path restoration, performing a shortest path first (SPF) calculation with said primary path UMH as a next hop.

5. The method of claim 1, further comprising:
in response to the arrival of traffic from the primary path UMH prior to expiry of the timer, removing the cached secondary path UMH and adapting the forwarding plane to accept traffic associated with the primary path UMH.

6. The method of claim 1, further comprising:
performing a shortest path first (SPF) calculation via an interior gateway protocol (IGP).

7. The method of claim 6, wherein said IGP comprises one of Open Shortest Path First (OSPF), Intermediate System to Intermediate System (IS-IS), or Border Gateway Protocol (BGP).

8. The method of claim 1, wherein said primary path error is detected via Bidirectional Forwarding Detection (BFD), and said forwarding plane is adapted via Protocol Independent Multicast (PIM).

9. The method of claim 1, wherein the steps performed in response to detecting the primary path restoration are performed via Protocol Independent Multicast (PIM).

10. An apparatus configured to receive commonly sourced traffic via a first link associated with a primary path Upstream Multicast Hop (UMH) and a second link associated with a secondary path UMH, the apparatus comprising:
a processor and a memory communicatively connected to the processor, wherein the processor is configured to:
in response to detecting a primary path error, adapt a forwarding plane of a router to accept traffic associated with the secondary path UMH; and
in response to detecting a primary path restoration, compute a route including the primary path UMH as a primary path next hop, send a join from the router toward the primary path UMH based on the route for using the primary path UMH as a primary path next hop, mark the secondary path UMH for deletion at the router, cache the secondary path UMH at the router based on absence of the secondary path next hop from the route for maintaining the secondary path UMH as a secondary path next hop and for preventing deletion of the secondary path UMH at the router, start a timer associated with caching of the secondary path UMH at the router, and adapt the forwarding plane of the router to continue accepting traffic associated with the cached secondary path UMH until the occurrence of the expiry of said timer or the arrival of traffic from the primary path UMH.

11. A non-transitory computer-readable storage medium storing instructions which, when executed by a computer, adapt the operation of the computer to provide a method for use at a router configured to receive commonly sourced traffic via a first link associated with a primary path Upstream Multicast Hop (UMH) and a second link associated with a secondary path UMH, the method comprising:
in response to detecting a primary path error, adapting a forwarding plane of the router to accept traffic associated with the secondary path UMH; and
in response to detecting a primary path restoration, computing a route including the primary path UMH as a primary path next hop, sending a join from the router toward the primary path UMH based on the route for using the primary path UMH as a primary path next hop, marking the secondary path UMH for deletion at the router, caching the secondary path UMH at the router based on absence of the secondary path next hop from the route for maintaining the secondary path UMH as a secondary path next hop and for preventing deletion of the secondary path UMH at the router, starting a timer associated with caching of the secondary path UMH at the router, and adapting the forwarding plane of the router to continue accepting traffic associated with the cached secondary path UMH until the occurrence of the expiry of said timer or the arrival of traffic from the primary path UMH.

12. The method of claim 1, wherein sending the join toward the primary path UMH is performed based on identification of the primary path UMH as the primary path next hop within the route.

13. The method of claim 1, further comprising:
in response to detecting said primary path restoration, performing a shortest path first (SPF) calculation with said cached secondary path UMH as a next hop.

14. The method of claim 1, further comprising:
performing a shortest path first (SPF) calculation to determine a new secondary path next hop.

15. The method of claim 14, further comprising:
in response to expiry of the timer prior to receiving an indication of the new secondary path next hop, removing the cached secondary path UMH.

16. The method of claim 14, further comprising:
in response to receiving an indication that the new secondary path next hop is a new node that is different than the cached secondary path UMH, removing the cached secondary path UMH and sending a join based on the new node.

17. The method of claim 14, further comprising:
in response to receiving an indication that the new secondary path next hop is the cached secondary path UMH, disabling the timer.

18. An apparatus configured to receive commonly sourced traffic via a first link associated with a primary path Upstream Multicast Hop (UMH) and a second link associated with a secondary path UMH, the apparatus comprising:

a processor and a memory communicatively connected to the processor, wherein the processor is configured to:
  in response to detecting a primary path error, adapt a forwarding plane of a router to accept traffic associated with the secondary path UMH; and
  in response to detecting a primary path restoration:
    receive a route that includes the primary path UMH as a new primary path next hop and that does not include a new secondary path next hop;
    send a join from the router toward the primary path UMH, for using the primary path UMH as the primary path next hop, based on inclusion within the route of the primary path UMH as the new primary path next hop;
    mark the secondary path UMH for deletion at the router;
    cache the secondary path UMH at the router, for maintaining the secondary path UMH as a secondary path next hop and for preventing deletion of the secondary path UMH, based on absence of the new secondary path next hop from the route;
    start a timer associated with caching of the secondary path UMH at the router; and
    adapt the forwarding plane of the router to continue accepting traffic associated with the cached secondary path UMH until the occurrence of the expiry of the timer or the arrival of traffic from the primary path UMH.

* * * * *